United States Patent
Breault et al.

(10) Patent No.: US 11,557,770 B2
(45) Date of Patent: Jan. 17, 2023

(54) MOLDING PROCESS FOR MAKING FUEL CELL COMPONENTS

(71) Applicant: DOOSAN FUEL CELL AMERICA, INC., South Windsor, CT (US)

(72) Inventors: Richard D. Breault, North Kingstown, RI (US); Kishore Kumar Tenneti, Manchester, CT (US)

(73) Assignee: Hyaxiom, Inc., East Hartford, CT (US)

( * ) Notice: Subject to any disclaimer, the term of this patent is extended or adjusted under 35 U.S.C. 154(b) by 1071 days.

(21) Appl. No.: 15/121,204

(22) PCT Filed: Feb. 27, 2014

(86) PCT No.: PCT/US2014/018844
§ 371 (c)(1),
(2) Date: Aug. 24, 2016

(87) PCT Pub. No.: WO2015/130280
PCT Pub. Date: Sep. 3, 2015

(65) Prior Publication Data
US 2017/0012298 A1    Jan. 12, 2017

(51) Int. Cl.
*H01M 8/0258*    (2016.01)
*H01M 8/0213*    (2016.01)
(Continued)

(52) U.S. Cl.
CPC .......... *H01M 8/0258* (2013.01); *B29B 11/10* (2013.01); *B29B 13/02* (2013.01); *B29C 43/003* (2013.01); *B29C 43/02* (2013.01); *B29C 43/021* (2013.01); *H01M 8/0213* (2013.01); *H01M 8/0221* (2013.01); *H01M 8/0226* (2013.01);
(Continued)

(58) Field of Classification Search
CPC ............. H01M 8/0258; H01M 8/0213; H01M 8/0221; H01M 8/0226; H01M 8/086; B29B 11/10; B29B 13/02; B29C 43/003; B29C 43/02; B29C 43/021; Y02P 70/56;
(Continued)

(56) References Cited

U.S. PATENT DOCUMENTS 6,180,275 B1    1/2001    Braun et al.
7,842,433 B2    11/2010    Nakanishi et al.
(Continued)

OTHER PUBLICATIONS

Wikipedia "Extrusion" https://en.wikipedia.org/wiki/Extrusion, obtained Dec. 19, 2019 (Year: 2019).*
(Continued)

*Primary Examiner* — Michael M. Robinson
(74) *Attorney, Agent, or Firm* — Carlson, Gaskey & Olds, P.C.

(57) ABSTRACT

An illustrative method of making a fuel cell component includes obtaining at least one blank plate including graphite and a polymer; establishing a temperature of the blank that is sufficient to maintain the polymer in an at least partially molten state; and applying a compression molding force to the blank until the polymer is essentially solidified to form a plate including a plurality of channels on at least one side of the plate. The blank plate has a central area having a first (Continued)

thickness. The blank plate also has two generally parallel edges on opposite sides of the central area. The edges have a second thickness that is greater than the first thickness.

5 Claims, 5 Drawing Sheets

(51) Int. Cl.
*H01M 8/086* (2016.01)
*H01M 8/0226* (2016.01)
*H01M 8/0221* (2016.01)
*B29C 43/02* (2006.01)
*B29B 11/10* (2006.01)
*B29B 13/02* (2006.01)
*B29C 43/00* (2006.01)
*B29L 31/34* (2006.01)
*B29K 23/00* (2006.01)
*B29K 105/16* (2006.01)

(52) U.S. Cl.
CPC ......... *H01M 8/086* (2013.01); *B29K 2023/14* (2013.01); *B29K 2105/16* (2013.01); *B29K 2995/0003* (2013.01); *B29L 2031/3468* (2013.01); *Y02P 70/50* (2015.11)

(58) Field of Classification Search
CPC ............ B29K 2023/14; B29K 2105/16; B29K 2995/0003; B29L 2031/3468
See application file for complete search history.

(56) References Cited

U.S. PATENT DOCUMENTS

| | | |
|---|---|---|
| 2002/0039675 A1 | 4/2002 | Braun et al. |
| 2004/0058249 A1 | 3/2004 | Cai et al. |
| 2004/0191608 A1 | 9/2004 | Chopra et al. |
| 2005/0238941 A1* | 10/2005 | Nishi .................. H01M 8/0213 429/482 |
| 2006/0147781 A1 | 7/2006 | Cai et al. |
| 2007/0254204 A1 | 11/2007 | Shin et al. |
| 2010/0307681 A1 | 12/2010 | Breault et al. |
| 2012/0018914 A1* | 1/2012 | Utashiro ................ B29C 33/42 264/105 |
| 2012/0025420 A1 | 2/2012 | Utashiro et al. |

OTHER PUBLICATIONS

Muller, A. et al., "Injection moulding of graphite composite bipolar plates", Journal of Power Source, 2006, vol. 154, No. 2, pp. 467-471. See p. 468; and Figure 1.
International Search Report and Written Opinion for PCT Application No. PCT/US2014/018844, dated Nov. 24, 2014.
Middleman, E., et al., "Bipolar plates for PEM fuel cells", Journal of Power Sources, 2003, vol. 118, pp. 44-46.
Supplementary European Search Report for European Application No. 14884192.7, completed Jun. 9, 2017.
International Preliminary Report on Patentability for International Application No. PCT/US2014/018844 dated Sep. 9, 2016.

* cited by examiner

MOLDING PROCESS FOR MAKING FUEL CELL COMPONENTS

TECHNICAL FIELD

The subject matter of this document generally pertains to a method of making fuel cell components. More particularly, and without limitation, the subject matter of this document pertains to a method of molding fuel cell components.

RELATED ART

Fuel cells are useful for generating electricity based on an electrochemical reaction. A variety of components are included in a fuel cell to facilitate the electrochemical reaction. One such component is known as a flow field plate because it includes a plurality of channels for directing reactants within the fuel cell. Some flow field plates are also referred to as separator plates.

Materials often used to make a separator or flow field plate include graphite and a hydrophobic polymer, such as fluorinated ethylene propylene (FEP). Some manufacturing processes include introducing a powder or paste mix of the graphite and polymer into a mold. There are several challenges associated with known manufacturing techniques.

One difficulty is that the combination of around 85% graphite and 15% polymer results in a mold compound with a high melt viscosity. The compound has very slow lateral flow within a mold, which can result in unfilled regions within the mold and regions of the part that have low density.

A related difficulty with known manufacturing techniques is that the molding compound makes it challenging to achieve the different areal weights of the plate in different sections or regions of the plate. For example, the active area of the plate typically has one areal weight while seal areas tend to have a higher weight. The characteristics of typical molding compounds make it challenging to achieve these different weights.

Additionally, there are different compression ratios between sections of the plate that establish webs or channels and other sections that establish ribs between the webs or channels. The different compression ratios between the web sections and rib sections make it difficult to achieve the required density in the rib sections, especially when molds are filled with powder material or a paste-extruded molding material. The relative complexity of a typical flow field plate contributes to these challenges. For example, a bipolar separator plate may have a planform of 500 mm by 500 mm and include on the order of 150 reactant flow channels that are about 1.4 mm wide by about 0.7 mm deep for a cathode flow field. Anode flow fields include channels that are about 1.4 mm wide by about 1 mm deep.

In the case of phosphoric acid fuel cells, a separator plate preferably has a very low electrolyte take-up and a very low rate of through-plane acid transfer over the lifetime of the fuel cell, which may be on the order of 10 to 20 years. Acid tends to permeate a separator plate from the cathode side toward the anode side of the plate because of electrochemical oxidation or corrosion of the surface of the graphite. Oxidation tends to make graphite more hydrophilic, which results in the plate being wet by the acid electrolyte. It is desirable to orient flake graphite, for example, in a separator plate so that the larger surfaces of the flakes are aligned perpendicular to the through-plane direction. This orientation results in a higher tortuosity to through-plane acid penetration.

Polymers such as fluorinated ethylene propylene (FEP) do not have a single melting point; but have a melting range that extends from about 200 to 300° C. An example diagram illustrating this feature of FEP is included in FIG. 8. This is a result of the polymer containing a range of molecular weights. Experience has shown that FEP should be extruded at temperatures where it is completely melted such as 300-380° C. and has a relatively lower melt viscosity. Experience has also shown that the part should not be removed from the mold until most of the FEP has solidified with 200-210° C. being the maximum temperature at which a part should be when removed from the mold. Removing the part from the mold above this temperature may reduce the density and thermal and electrical conductivity features of the part, which is undesirable in some situations.

Previous manufacturing techniques that address the various concerns mentioned above tend to be relatively expensive. Additionally, they have not proven consistently reliable in meeting the industry expectations.

SUMMARY

An illustrative example method of making a fuel cell component includes obtaining at least one blank plate including graphite and a polymer; establishing a temperature of the blank plate that is sufficient to maintain the polymer in an at least partially molten state; and applying a compression molding force to the blank until at least the polymer is solidified to form a plate including a plurality of channels on at least one side of the plate. The blank plate has a central area having a first thickness. The blank plate also has two generally parallel edges on opposite sides of the central area. The edges have a second thickness that is greater than the first thickness.

In an example method including one or more features of the method of the previous paragraph, obtaining the blank plate comprises extrusion molding a mixture of the graphite and the polymer to form the blank.

An example method including one or more features of the method of either of the previous paragraphs includes extrusion molding the blank plate; subsequently transferring the blank plate into a compression mold while the temperature is the established temperature; and applying the compression molding force in the compression mold.

In an example method including one or more features of the method of any of the previous paragraphs, establishing the temperature of the blank occurs during the extrusion molding, and applying the compression molding force occurs subsequent to the extrusion molding and before the temperature of the extruded blank plate cools below the temperature at which the polymer is solidified.

In an example method including one or more features of the method of any of the previous paragraphs, obtaining the blank plate comprises compression molding a mixture of the graphite and the polymer to form the blank.

In an example method having one or more features of the method of any of the previous paragraphs, establishing a temperature of the blank includes heating the blank subsequent to compression molding the blank and prior to applying the compression molding force.

In an example method having one or more features of the method of any of the previous paragraphs, the established temperature is at least 300° C.

In an example method having one or more features of the method of any of the previous paragraphs, the established temperature is between 300° C. and 380° C.

A method including one or more features of the method of any of the previous paragraphs includes applying the compression molding force until the temperature of the plate cools to about 200° C.

In an example method having one or more features of the method of any of the previous paragraphs, the compression molding force is at least 1,000 psi (7,000 kPa).

In an example method having one or more features of the method of any of the previous paragraphs, the compression molding force is between 1,000 psi and 2,000 psi (7,000 kPa and 14,000 kPa).

In an example method having one or more features of the method of any of the previous paragraphs, the formed plate has a first areal density along the channels; and the formed plate has a second, greater areal density along the two edges.

An example method having one or more features of the method of any of the previous paragraphs includes obtaining a first blank plate that has two generally parallel first edges that are thicker than a central portion of the first blank plate; obtaining a second blank plate that has two generally parallel second edges that are thicker than a central portion of the second blank plate; situating the first blank plate adjacent the second blank plate with the first edges generally perpendicular to the second edges; and applying the compression molding force to the situated first and second blank plates.

In a method having one or more features of the method of any of the previous paragraphs, the polymer comprises fluorinated ethylene propylene (FEP).

In a method having one or more features of the method of any of the previous paragraphs, the graphite comprises flake graphite.

In an example method having one or more features of the method of any of the previous paragraphs, the formed plate comprises a bipolar separator plate.

The various features and advantages of at least one disclosed example embodiment will become apparent to those skilled in the art from the following detailed description. The drawings that accompany the detailed description can be briefly described as follows.

DETAILED DESCRIPTION

Figure 1:
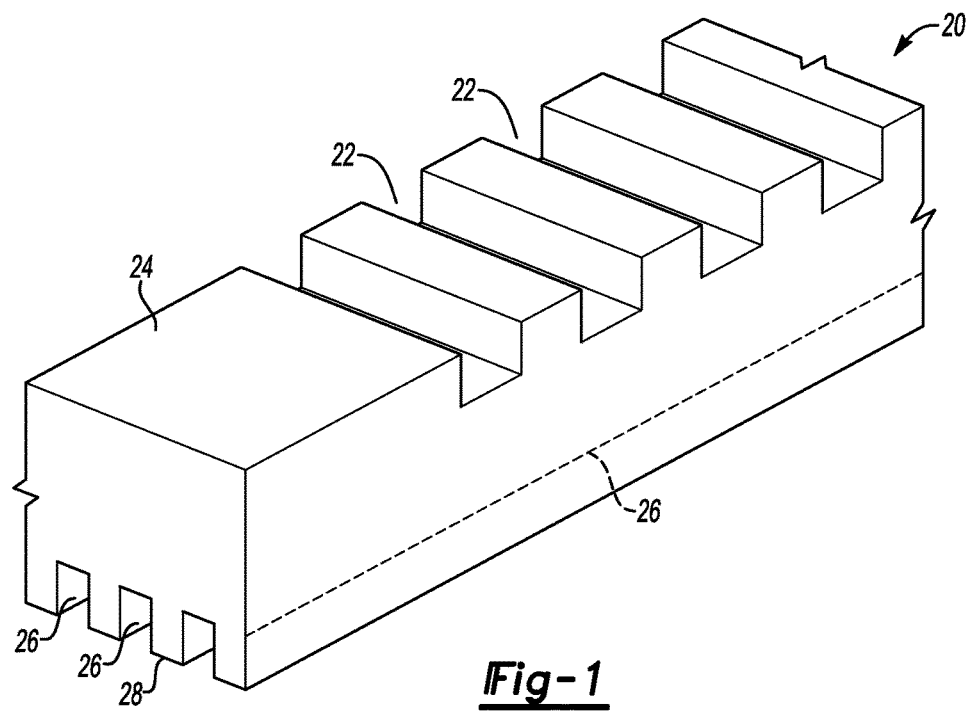
FIG. 1 illustrates selected portions of an example fuel cell component made using a method according to an embodiment of this invention.

FIG. 1 illustrates an example fuel cell component 20, which is a bipolar separator plate. A plurality of channels 22 are provided on one side 24 of the plate for directing a reactant within a fuel cell to facilitate an electrochemical reaction. A plurality of flow field channels 26 are provided on an opposite side 28 of the example plate for directing another reactant within a fuel cell. While a bipolar separator plate including flow field channels is shown as an example fuel cell component, other components may be made using a method designed according to an embodiment consistent with that described below.

Figure 2:
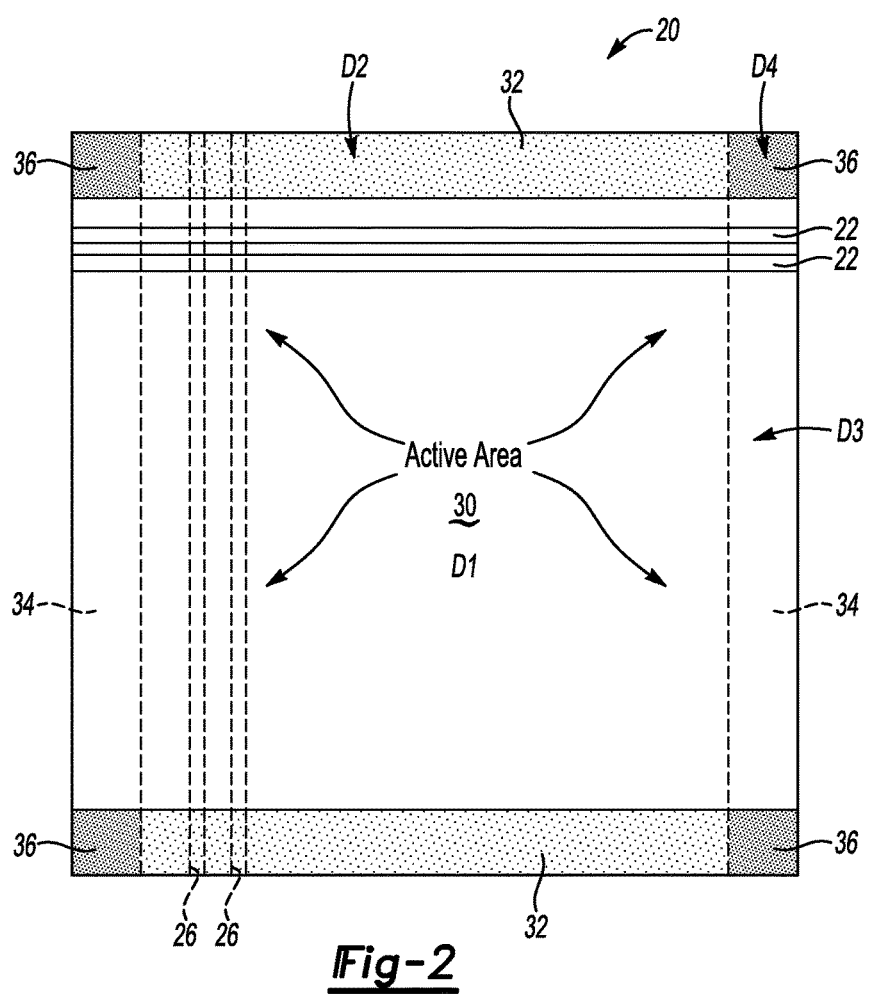
FIG. 2 is an elevational view schematically representing selected features of the example fuel cell component of FIG. 1.

FIG. 2 schematically illustrates various portions of the example fuel cell component 20. An active area 30 extends across a majority of the surface area of the plate 20. The active area 30 is that portion of the plate 20 where reactants are involved in the electrochemical reaction within the fuel cell. Only some of the channels 22 and 26 are illustrated in FIG. 2 for discussion purposes. An example embodiment may include on the order of 150 flow channels 22 on one side of the plate 20 and a similar number of the channels 26 on an opposite side.

The active area 30 has a first areal density D1. Two edges 32 of the plate 20 have a second areal density D2, which is greater than the first density D1 of the active area 30. The edges 32 serve as seal areas to control movement of reactants within the fuel cell. Two other edges 34 of the plate 20 also serve as seal regions and include a third areal density D3. In some examples, the second density D2 and the third density D3 are approximately equal. In an example embodiment where the plate 20 comprises a bipolar separator plate for a phosphoric acid fuel cell, the first areal density D1 is on the order of 0.50 gm/sq-cm, the second areal density D2 and the third areal density D3 are on the order of 0.58-0.62 gm/sq-cm.

In the example of FIG. 2, there are corner regions 36 that include a fourth areal density D4. In an example embodiment of a phosphoric acid fuel cell separator plate, the fourth areal density D4 is on the order of 0.70 gm/sq-cm.

Figure 3:
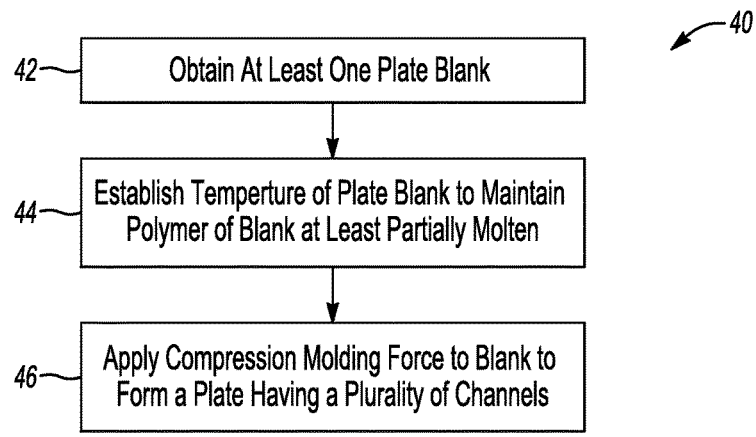
FIG. 3 is a flowchart diagram summarizing an example method of making a fuel cell component according to an embodiment of this invention.

FIG. 3 includes a flow chart diagram 40 that summarizes an example approach for making a fuel cell component, such as the separator plate shown in FIGS. 1 and 2. At 42, the process beings by obtaining at least one blank plate. At 44 a temperature of the blank plate is established to maintain a polymer of the blank plate in an at least partially molten state. In examples where the blank plate comprises fluorinated ethylene propylene (FEP) or a similar polymer and graphite, the temperature used at 44 will be on the order of 300-380° C. Polymers such as FEP may be considered completely melted in a temperature range of 300-380° C. FEP, for example, begins to solidity at a temperature of about 275° C.

At 46, a compression molding force is applied to the blank plate to form a plate having a plurality of channels.

Figure 4:
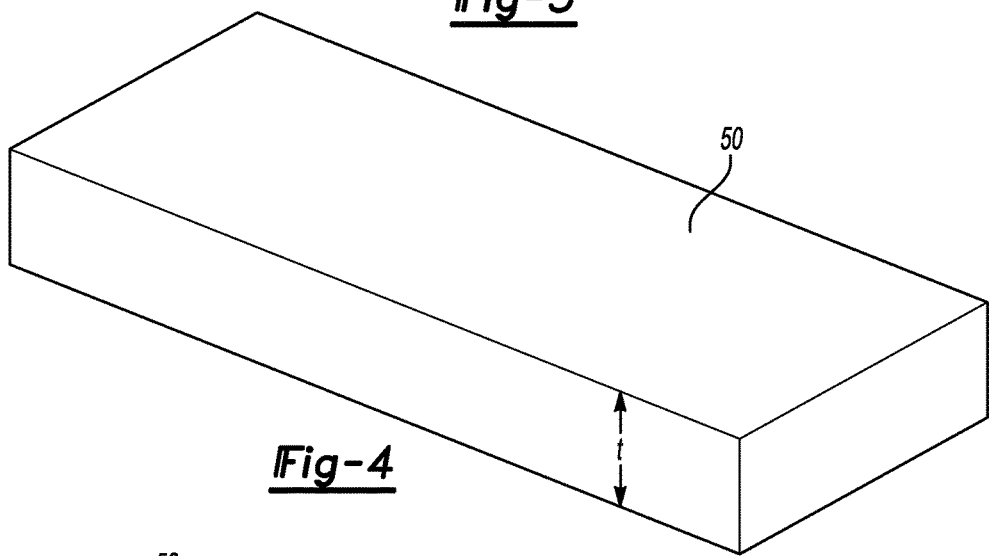
FIG. 4 illustrates an example blank plate embodiment.
Figure 5:
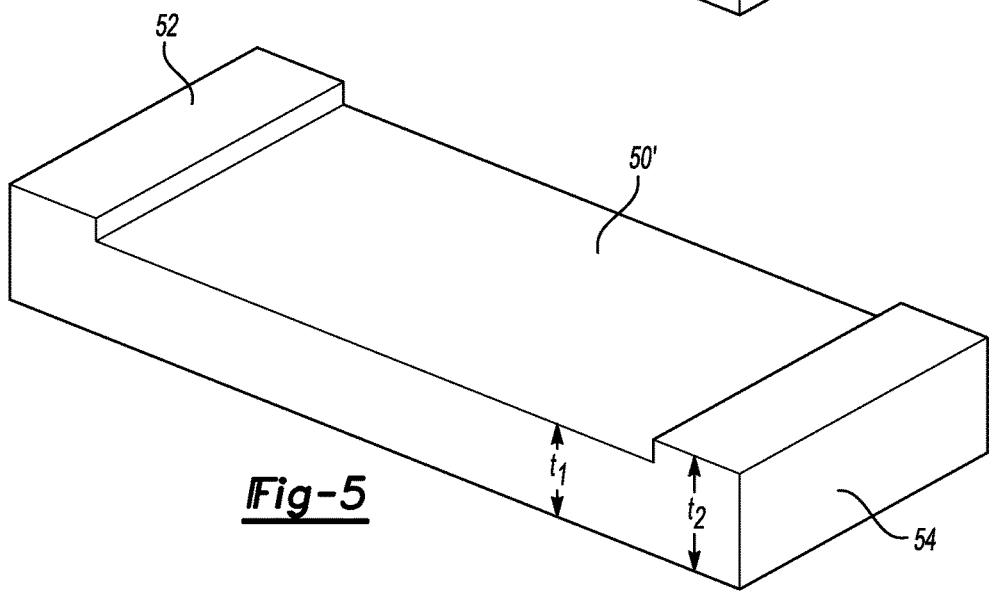
FIG. 5 illustrates another example blank plate embodiment.

FIGS. 4 and 5 show example blank plate configurations. A first blank plate arrangement 50 is shown in FIG. 4. This example includes an essentially uniform thickness t along the entire cross section of the blank plate 50. In the example of FIG. 5, the blank plate 50' has a first thickness $t_1$ and a second, greater thickness $t_2$ along edges 52 and 54, which are generally parallel to each other. One aspect of the blank plate 50' from FIG. 5 compared to that of FIG. 4 is that the thicker edges 52 and 54 facilitate establishing higher densities of the seal regions along edges of the eventually formed fuel cell component. The larger thickness $t_2$ and the slow lateral flow of the mixture used for establishing the fuel cell component (e.g., 85% flake graphite and 15% FEP) facilitate establishing higher density seal regions along the edges of the eventually formed fuel cell component.

Figure 6:
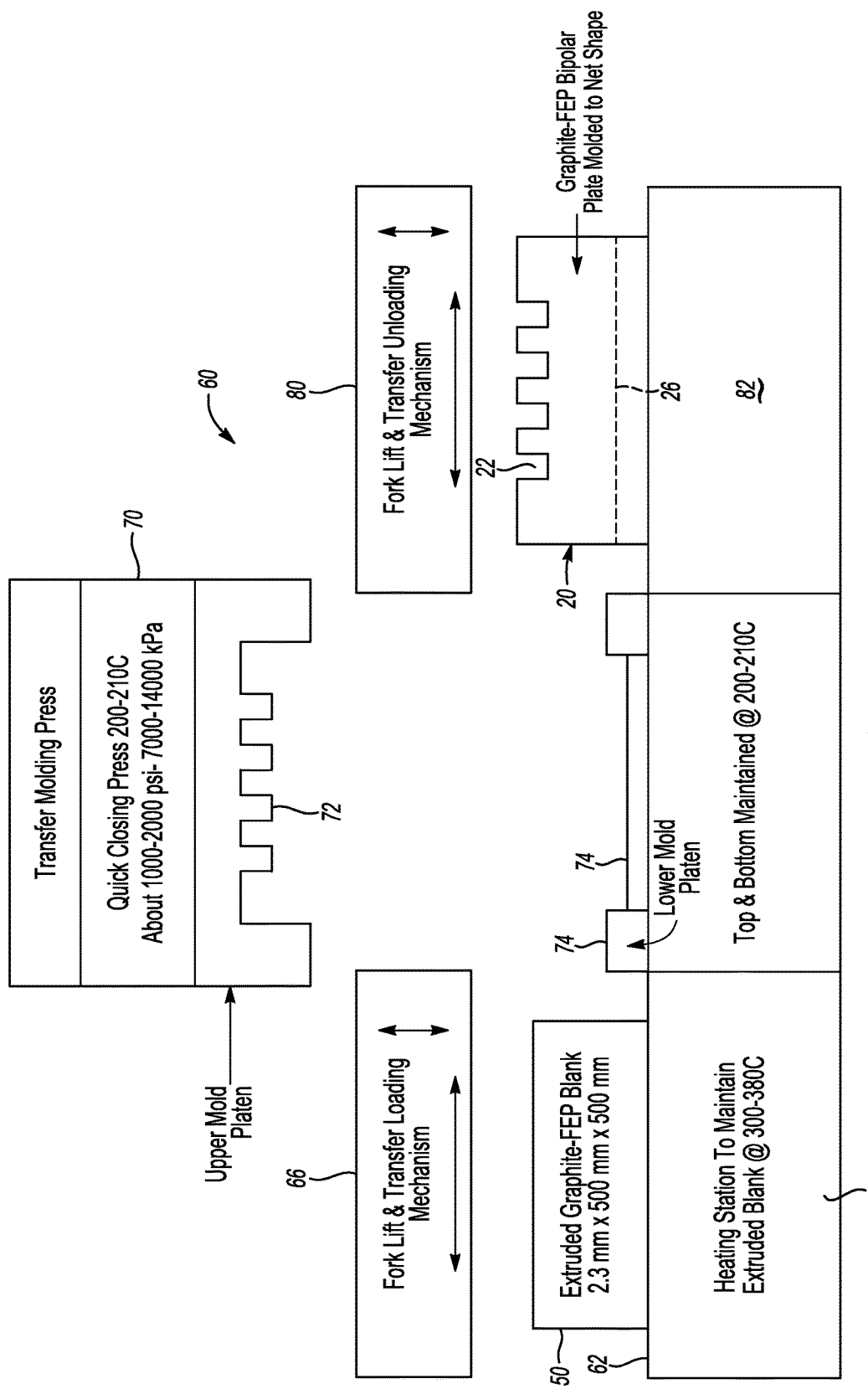
FIG. 6 schematically illustrates a molding method and molding machinery according to an embodiment of this invention.

FIG. 6 schematically shows machinery 60 configured to make fuel cell components. A blank plate 50 is situated on the surface 62 of a heating station 64. In some examples, the blank plate 50 is obtained using an extrusion molding process. The extrusion mold (not illustrated) heats the graphite and polymer mixture to a temperature sufficient to melt the polymer. In the case of FEP, the extruder may heat the mixture to a temperature in the range from about 300° C. to about 380° C. The heating station 64 facilitates maintaining a desired temperature of the blank plate 50. An extruded blank may be at a temperature between 300° C. and 380° C. The heating station 64 facilitates maintaining that temperature to keep the polymer in an at least partially molten state.

In other examples, the blank plate 50 is obtained using a compression molding process. In some such examples, the blank plate 50 will be placed onto the surface 62 when the temperature of the polymer has dropped below a temperature at which the polymer solidifies. In such examples, the heating station 64 increases the temperature of the blank plate 50 to establish a temperature that is sufficient to maintain the polymer in an at least partially molten state.

This example includes a compression mold 70 having platens 72 and 74 that have surfaces configured to establish the desired shape of the fuel cell component. For example, the platens 72 and 74 include a plurality of ridges for establishing ribs and flow channels on at least one side of a flow field plate. The platens 72 and 74 in this example are maintained at a temperature of approximately 200° C. The compression molding pressure applied by the mold 70 is on the order of 1,000 to 2,000 psi (7,000 to 14,000 kPa). The mold device 70 is a quick closing style press so that the compression molding force is applied to the blank plate 50 while the temperature of the blank is still high enough so that the polymer is in an at least partially molten state.

With the established temperature of the blank plate 50 sufficiently high, a transfer mechanism 66 removes the blank plate 50 from the surface 62 and places it onto the lower mold platen 74. The mold device 70 will remain closed with pressure being applied to the material within the mold until the polymer is essentially solidified and reaches a temperature corresponding to the temperature of the platens 72 and 74 (e.g., 210° C.).

A transfer mechanism 80 is configured to remove the molded fuel cell component 20 from the lower mold platen 74 and situate it on a cooling device 82, such as a quench table. Once the component 20 has sufficiently cooled, it may be placed in a fuel cell or an inventory of fuel cell components.

In some embodiments, the transfer mechanisms 66 and 68 are forklift and transfer devices that include telescoping forks that can move the blank plate or molded fuel cell component from one position into another with great precision. Some example embodiments include a fork transfer device that utilizes a vacuum for lifting and holding the blank plate or molded component.

Figure 7:
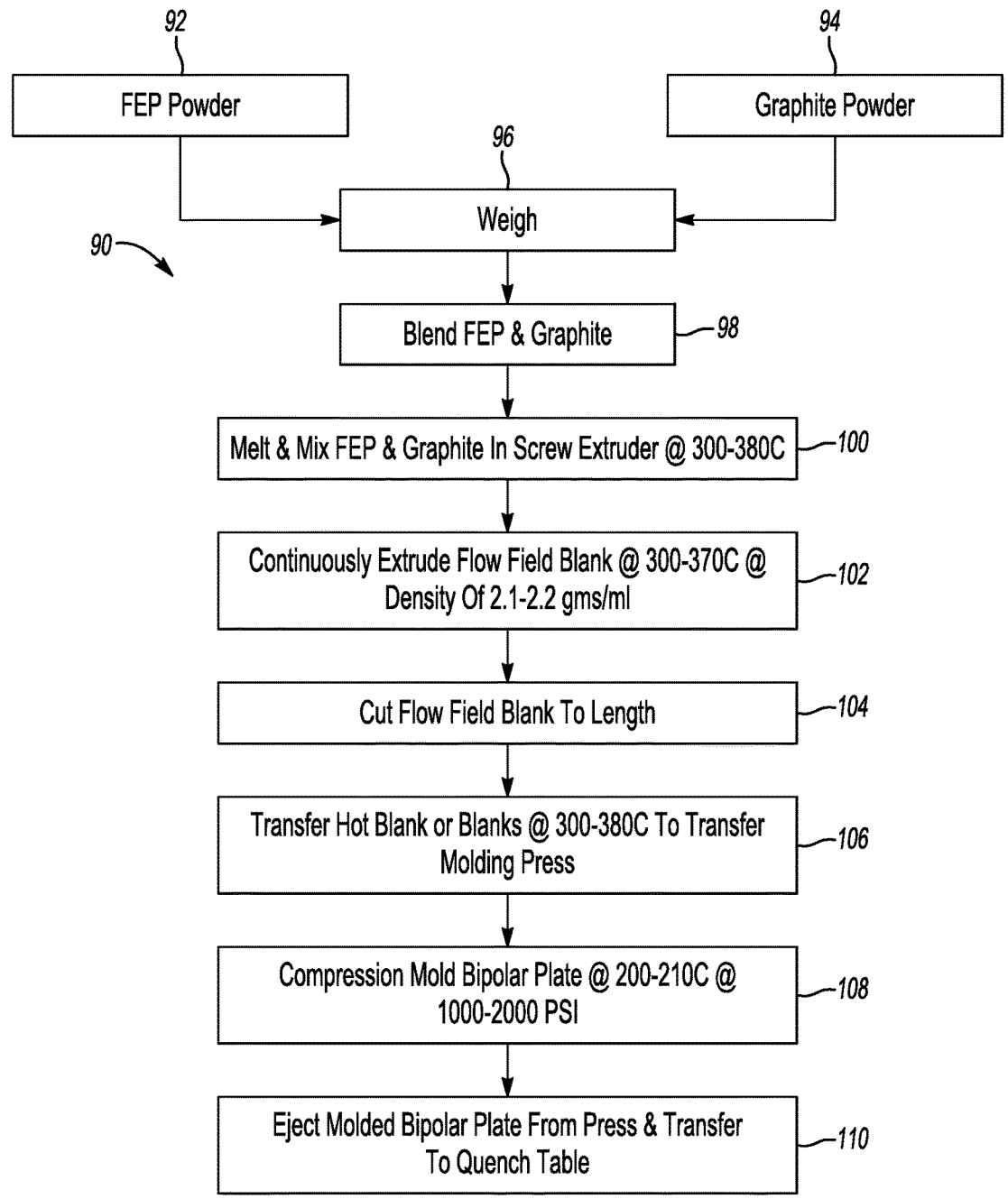
FIG. 7 is a flowchart diagram summarizing an example fuel cell component manufacturing process.
Figure 8:
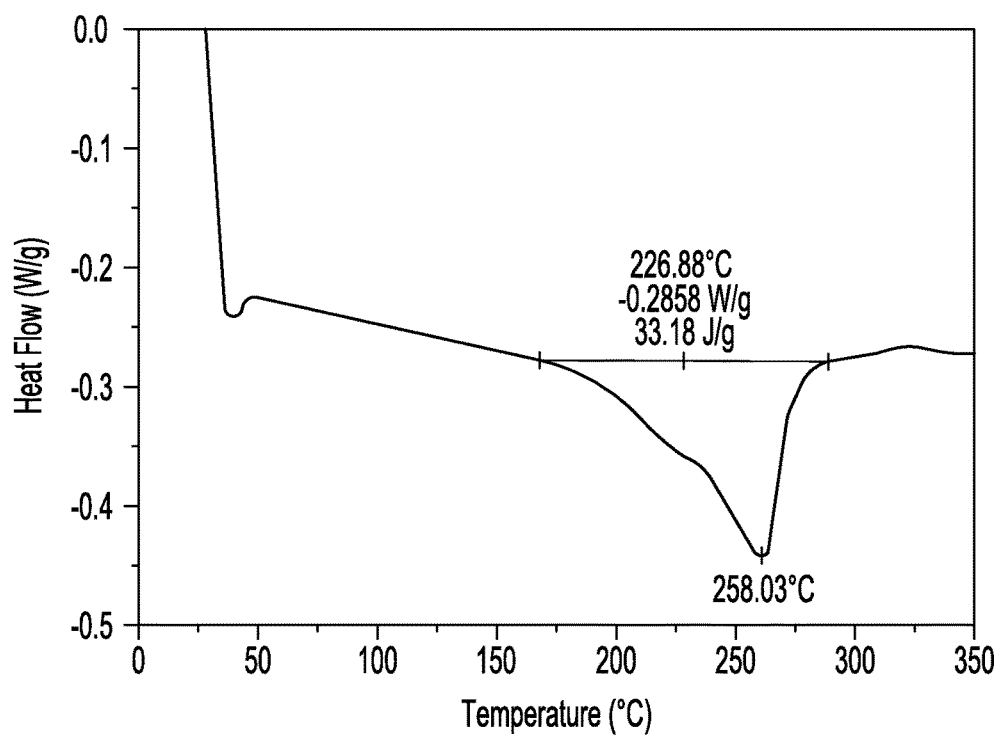
FIG. 8 illustrates a melting point feature of an example prior art polymer.

FIG. 7 includes a flow chart diagram 90 that summarizes an example approach of using an arrangement such as that shown in FIG. 6. Polymer, such as FEP powder 92, and graphite powder 94 are appropriately weighed out at 96 to achieve a desired mixture. For example, the mixture may comprise 85% graphite powder and 15% FEP. The FEP and graphite are blended at 98. The polymer is melted and the FEP and graphite are mixed in a screw extruder at 100. When FEP is the selected polymer, the extruder heats the polymer to a temperature on the order of 300 to 380° C.

At 102, a blank plate is continuously extruded at a temperature of at least 300° C. In this example, the blank plate has a density on the order of 2.1 to 2.2 gms/ml. At 104, the blank plate is cut to length. At 106 the blank plate is transferred to a molding press such as the molding device 70. This transfer occurs while the blank plate is still hot enough so that the polymer is in an at least partially molten state.

At 108, a compression molding force is applied to mold the fuel cell component, such as a bipolar plate. As described above, a compression molding force on the order of 1,000 to 2,000 psi is applied using platens that are maintained at a temperature on the order of 200 to 210° C. At 110, the molded fuel cell component 20 is ejected from the molding device and transferred to a cooling device such as a quench table.

Using a blank plate 50' as shown in FIG. 5 facilitates establishing different material densities in the eventually molded fuel cell component. A single blank plate like that shown in FIG. 5 has more material at the edges 52 and 54 compared to the central region of the blank plate 50'. During compression molding, the additional material at the edges 52 and 54 results in a higher density of the molded component along those edges, in part, because of the slow lateral flow of the material within the mold.

Situating two blank plates 50' relative to each other so that the edges 52 and 54 of one blank plate are perpendicular to the edges 52 and 54 of the other blank plate provides four edges having more material than the amount of material along the central region of the blank plates 50'. When the two blank plates situated adjacent each other in this orientation are subjected to compression molding, the four edges of the resulting component have a higher material density compared to the central region, which corresponds to an active region of a flow field plate, for example.

While various embodiments and examples are described above, the features of each embodiment are not necessarily restricted to any particular embodiment. One or more features of any of the embodiments may be combined with one or more features of another embodiment.

The preceding description is illustrative rather than limiting in nature. Variations and modifications to the disclosed embodiments may become apparent that do not necessarily depart from the essence of this invention. The scope of legal protection can only be determined by studying the following claims.

We claim:

1. A method of making a fuel cell component, comprising the steps of:
   extrusion molding a mixture of a graphite and a polymer to form a first blank plate that has two generally parallel first edges that are thicker than a central portion of the first blank plate; and
   a second blank plate that has two generally parallel second edges that are thicker than a central portion of the second blank plate;
   establishing a temperature of the blank plates during the extrusion molding that is sufficient to maintain the polymer in a partially molten state;
   transferring the blank plates into a compression mold while the temperature is the established temperature;
   situating the first blank plate adjacent the second blank plate with the first edges generally perpendicular to the second edges; and
   applying a compression molding force to the situated first and second blank plates in the compression mold at least until the polymer essentially solidifies to form a plate including a plurality of channels on at least one side of the plate.

2. A method of making a fuel cell component, comprising:
obtaining a first blank plate that has two generally parallel first edges that are thicker than a central portion of the first blank plate;
obtaining a second blank plate that has two generally parallel second edges that are thicker than a central portion of the second blank plate, the first and second plates each comprising graphite and a polymer;
situating the first blank plate adjacent the second blank plate with the first edges generally perpendicular to the second edges;
establishing a temperature of the blank plates that is sufficient to maintain the polymer in each plate in a partially molten state; and
applying a compression molding force to the situated first and second blank plates at least until the polymer in each blank plate essentially solidifies to form a plate including a plurality of channels on at least one side of the plate.

3. The method of claim 2, wherein the polymer comprises fluorinated ethylene propylene (FEP).

4. The method of claim 2, wherein the graphite comprises flake graphite.

5. The method of claim 2, wherein the formed plate comprises a bipolar separator plate.

* * * * *